Feb. 26, 1952  G. LEVESQUE DU ROSTU  2,587,339
INTERNAL-COMBUSTION ENGINE
Filed July 20, 1945  2 SHEETS—SHEET 1
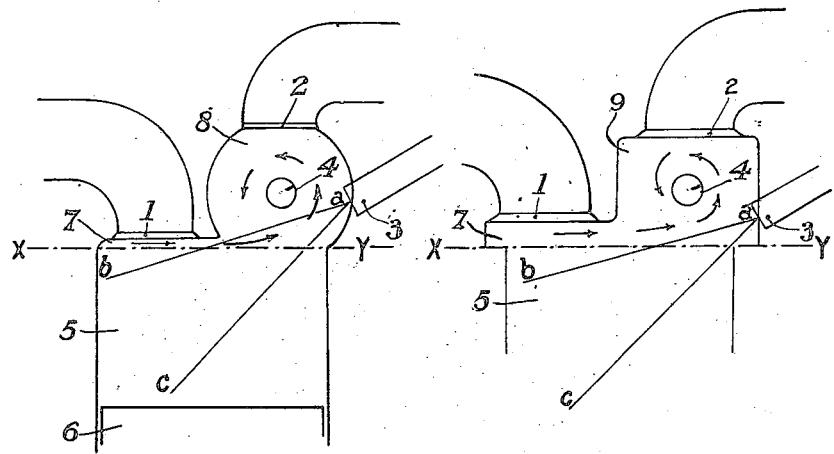
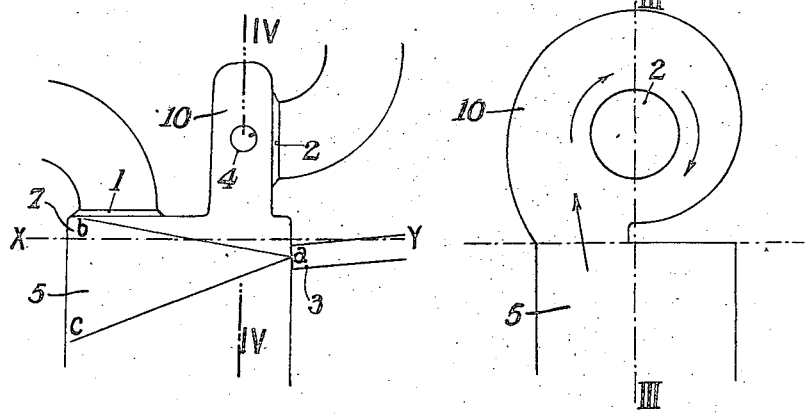
Inventor
G. Levesque du Rostu Feb. 26, 1952   G. LEVESQUE DU ROSTU   2,587,339
INTERNAL-COMBUSTION ENGINE
Filed July 20, 1945   2 SHEETS—SHEET 2
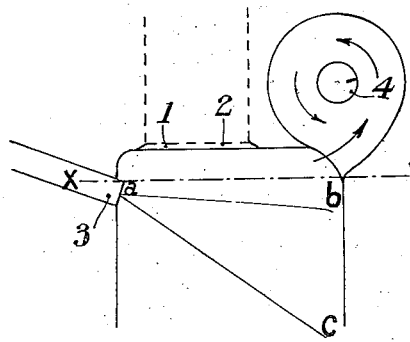
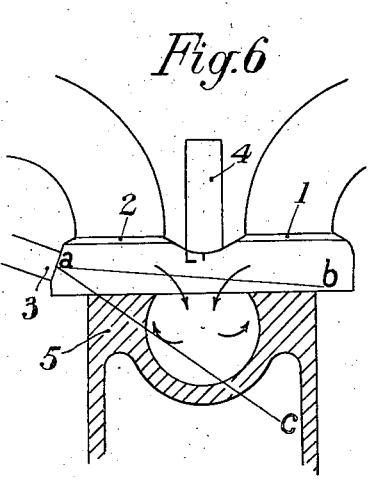
Inventor
G. Levesque du Rostu Patented Feb. 26, 1952

2,587,339

UNITED STATES PATENT OFFICE 2,587,339

INTERNAL-COMBUSTION ENGINE

Georges Levesque du Rostu, Paris, France, assignor to Societe Anonyme Andre Citroen, Paris, France Application July 20, 1945, Serial No. 606,228
In France October 15, 1942

Section 1, Public Law 690, August 8, 1946
Patent expires October 15, 1962

4 Claims. (Cl. 123—32)

The present invention consists essentially in new means and devices enabling the output of combustion engines with internal injection of fuel and artificial ignition to be increased, such increase being due, mainly, to the possibility of running with poor mixtures, decidedly leaner than those enabling a correct running of conventional engines.

It is well known that, in order for an engine with internal injection of fuel and controlled ignition to operate properly, certain arrangements must be made.

It is known that, in such engines, if special precautions are not taken, the fuel does not mix in a homogeneous manner with the air and the phenomenon of stratification occurs. However, provided certain conditions, difficult of fulfillment under all modes of operation of the engine, are satisfied, stratification enables mixtures that are as a whole leaner in fuel to be used than a homogeneous mixture would allow. On the other hand, stratification prevents the air drawn in by the engine from being used properly and it decreases the yield when maximum power is desired with mixtures rich in fuel.

Likewise various means for diminishing or suppressing stratification are known.

It would therefore be desirable to have a fuel injection engine in which the effects of stratification would be suppressed for rich mixtures, resulting in the production of high power, and, on the contrary, said effects would be used at a maximum to obtain correct running with mixtures that are lean as a whole, producing smaller power with a high yield.

In accordance with the present invention, an engine fulfilling the aforesaid conditions is obtained by the new association of means for producing, in particular, the two following results:

1. To distribute the whole mass of the fuel in the combustion chamber (by means for example of multiple jet injectors) and in particular in the air flow drawn in through the inlet valve, in order to correctly utilize the air of combustion with rich mixtures, without preventing local stratification (around each jet, in the case of multiple jets) and, for that purpose, to inject the fuel into the air without turbulence (or with slight turbulence).

2. With the threefold object of mitigating the effects of stratification with rich mixtures, of allowing the ignition of mixtures lean as a whole, and of increasing the speed of combustion of these lean mixtures, to produce high turbulence towards the end of the compression and to start ignition in the turbulent zone.

An engine embodying these means will exhibit the following characteristics: high power as a result of the air being correctly utilized, possibility of running with much leaner mixtures than those obtained with conventional engines (excess of air of the order of 100%), high yield in operation with lean mixtures.

The engine can further be improved by the following additional arrangements:

3. The locating of the turbulence chamber in a hot region of the combustion chamber, in order that ignition shall occur at a suitable point to avoid detonation.

4. In the case of distribution by poppet valves, the location of the exhaust valve in the turbulence chamber so as to produce the 3rd arrangement, and allow the waste gases to be properly exhausted. This arrangement will be of special interest if the process known under the term "scavenging" is used in order to have the waste gases expelled by the incoming air above atmospheric pressure, during a part of the cycle common to admission and to exhaust.

5. The end of the combustion takes place in a well cooled region of the cylinder head and having a large surface relative to its volume, so as to reduce the possibility of detonation. It is of advantage to locate this region around the admission valve when poppet valves are employed for intake and exhaust.

The invention will be better understood with the help of the additional description which is given below, by way of example, in reference to the accompanying drawing in which:

Figure 1 is a view illustrating diagrammatically a cylinder head and piston.

Figure 2 shows a first modification.

Figures 3 and 4 show a further modification and Figures 5 and 6 illustrate further modifications.

The engine according to the present invention comprises a cylinder 5 in which a piston 6 reciprocates and a cylinder head 7. At one side of the center line of the cylinder there is reciprocably mounted, parallel to the axis of the cylinder, an admission valve (not shown) of the poppet type for which a valve seat 1 is formed in the under face of the cylinder head. The air which forms part of the explosive mixture enters through the admission valve past the valve seat 1 and passes directly to the cylinder 5 without having any turbulence imparted thereto.

On the opposite side of the axis of the cylinder 5 there is formed in the cylinder head a turbulence chamber 8 in which combustion takes place. This turbulence chamber is shaped in cross section as a sphere of revolution which at its bottom is intersected chordally by the top of the cylinder 5 and with which it is in communication through the restricted opening along the plane of intersection. A spark plug 4 is positioned at one end of the turbulence chamber 8 and along a diameter of same. At the top of the turbulence chamber 8 there is reciprocably mounted, also parallel to the axis of the cylinder 5, an exhaust valve (not shown) of the poppet type for which a valve seat 2 is formed in the top of the turbulence chamber. In the outer side wall of the turbulence chamber 8 and adjacent the juncture of same with the cylinder 5 there is mounted in inclined relationship a dual jet injector nozzle 3. This injector nozzle is so positioned as to inject liquid fuel along the path indicated a—b across the bottom of the turbulence chamber 8 and top of the cylinder 5 just below the seat 1 of the admission valve and into the air stream admitted through the latter, and a second jet along the path a—c across an outer and lower sector of the turbulence chamber, substantially directly into the cylinder 5 and into the incoming air stream at approximately the mid-section of the cylinder, that is, at a much lower level than the upper jet along the path a—b. The jets along the paths a—b and a—c are thus projected into the incoming air stream admitted through the seat 1 of the admission valve and at different levels along the height of the cylinder 5, in accordance with the first desired result.

Towards the end of the compression stroke, the fuel mixture assumes a whirling movement as shown by the arrows. The position of the spark plug 4 along the axis of this whirling movement is in accordance with the second desired result.

Finally, it is obvious that combustion ends in the zone adjoining the admission valve 1, where the burning mixture is thoroughly cooled, firstly on account of the presence of the admission valve, and secondly owing to the fact that the thickness of the combustion chamber at that point is small and that the surfaces of heat exchange are extensive in comparison with the volume.

Figure 2 shows a form of embodiment similar to the preceding one; the only difference resides in that the turbulence chamber 9 is here of the shape of a cylinder of revolution with its axis perpendicular to but spaced apart from the axis of the cylinder 5.

Figures 1 and 2 show preferred forms of embodiment of the invention but other embodiments are also possible and shall now be given by way of example.

Figs. 3 and 4 are two views of one and the same form of embodiment, respectively along the line III—III of Fig. 4 and IV—IV of Fig. 3. The features of this embodiment are similar to those of the preceding embodiments from the standpoint of the operation of the engine. The turbulence chamber 10 is here also formed as a cylinder of revolution but with its axis positioned perpendicular to the axis of the cylinder. The seat 2 of the exhaust valve (not shown) is positioned along the axis of the turbulence chamber 10 and the spark plug 4 diametrically of the turbulence chamber. The direction of the stream of air at the end of compression stroke is shown by the arrows on Fig. 4.

Figure 5 shows a form of the invention in which the exhaust valve is located outside of the turbulence chamber. Admission and exhaust seats 1 and 2, arranged symmetrically with respect to the plane of the figure, are projected in the form of a common contour. The shape of the turbulence chamber is substantially spherical and the arrows show the direction of the air stream.

According to the modification shown in Figure 6, turbulence is produced by forming a recess in the piston 5; the sparking plug 4 is situated above this recess and is thus in a turbulent zone.

What I claim as my invention and desire to secure by Letters Patent is:

1. In a combustion engine operating through an injection of fuel the combination of means defining a cylinder, a cylinder head having an opening therein communicating directly with the cylinder, an air admission valve controlling said opening and through which opening air enters the cylinder in substantially non-turbulent condition, means defining a turbulent chamber including a top, said chamber communicating with the cylinder laterally of the air admission valve and having the shape of a surface of revolution about an axis perpendicular to the axis of the cylinder and communicating with the cylinder through a comparatively narrow opening, a sparking plug inside the turbulent chamber, the top of the turbulent chamber having an opening therein, an exhaust valve controlling said opening, and an injector including a plurality of jets opening into the turbulent chamber and directed so as to project the fuel during the admission stroke towards and to intermingle with the flow of air entering the cylinder through the admission valve at an area adjacent said valve.

2. The method of operating a fuel injection internal combustion engine which comprises injecting fuel on the suction stroke into the cylinder in at least two separate finely divided sprays, one of said sprays being directed into the incoming air in the cylinder along a path intersecting the cylinder wall adjacent the top of the cylinder and the other spray being directed into the incoming air in the cylinder along a path intersecting the cylinder wall a substantial distance beneath the first mentioned path, compressing the mixture of air and fuel thus formed in the cylinder and in a combustion chamber of cylindrical shape at the end of the cylinder on the compression stroke, and igniting said mixture.

3. The method of operating a fuel injection internal combustion engine which comprises injecting fuel into the cylinder in separate finely divided sprays and into the incoming air at two different levels on the suction stroke, compressing the mixture of air and fuel thus formed in the cylinder and in a combustion chamber of cylindrical shape at the end of the cylinder on the compression stroke and igniting the compressed mixture at the center of the whirl in said combustion chamber.

4. An internal combustion engine having a cylinder in which a piston is adapted to reciprocate, an air valve positioned at the top of the cylinder and parallel to the axis of same, a combustion chamber of circular cross section at the top of the cylinder and intersected chordally by the latter, an exhaust valve in said combustion chamber, an igniting device positioned in said combustion chamber along the axis of the latter, and a dual injection nozzle positioned in said combustion chamber adjacent the juncture of same with the cylinder, and adapted to project at least one finely divided spray across the combustion chamber into the top of the cylinder and at least another finely divided spray substantially directly into the cylinder at a lower level.

GEORGES LEVESQUE du ROSTU.

REFERENCES CITED

The following references are of record in the file of this patent:

UNITED STATES PATENTS

| Number | Name | Date |
| --- | --- | --- |
| 1,597,248 | Rathbun | Aug. 24, 1926 |
| 1,993,179 | Nibbs | Mar. 5, 1935 |
| 2,020,794 | Mock | Nov. 12, 1935 |
| 2,025,362 | Starr | Dec. 24, 1935 |
| 2,036,253 | Bremser | Apr. 7, 1936 |
| 2,086,427 | Mock | July 6, 1937 |
| 2,205,493 | Saurer | June 25, 1940 |